Sept. 9, 1930.  G. W. BLAIR  1,775,232
SECTIONAL FASTENER
Filed April 15, 1925
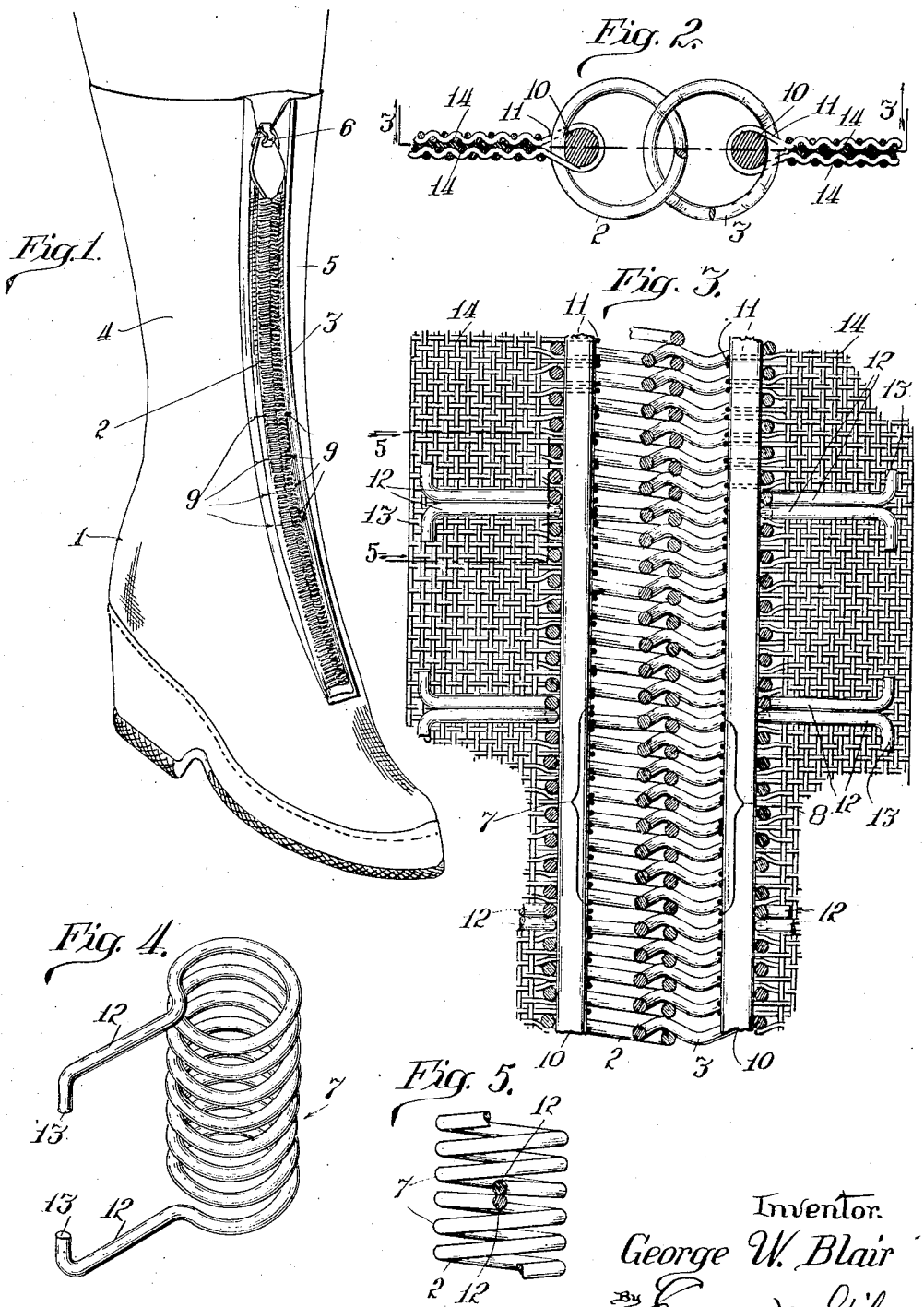
Inventor.
George W. Blair
By Eugene M. Giles
Attorney.

Patented Sept. 9, 1930

1,775,232

UNITED STATES PATENT OFFICE

GEORGE W. BLAIR, OF MISHAWAKA, INDIANA, ASSIGNOR TO MISHAWAKA RUBBER & WOOLEN MANUFACTURING COMPANY, OF MISHAWAKA, INDIANA, A CORPORATION OF INDIANA

SECTIONAL FASTENER

Application filed April 15, 1925. Serial No. 23,220.

My invention relates to fasteners of the quick operating type, wherein series of fastener elements are arranged on the opposed edges of the parts which are to be joined together and are adapted to be interlocked and released by the movement of a slider therealong.

In many cases wherein quick operating fasteners of the above mentioned type are employed, for example, in shoes and other wearing apparel, considerable bending or flexing of the fastener takes place, and with some types of quick operating fasteners, and particularly those having the individual elements joined together as in coiled fastener members, it is desirable to make special provision for bending, or to relieve the bending strain on the fastener members at points where excessive or constant bending takes place.

With my invention I make up the fastener member in sections which come together at the point or points where excessive bending occurs, and I connect the sections so that, while the continuity or uniform spacing of the individual fastener elements is maintained, flexibility is afforded at the juncture to permit bending or a sort of hinging action and thus relieve the fastener member of a large part of the bending action. It is a common practice to mount the fastener elements on tapes, stringers or other flexible parts, usually of fabric, and in practice I prefer to make use of the tape, stringer or other mounting to effect the flexible or hinge like connection between the fastener sections, although they may be otherwise connected, the essential requirement being to have a suitable connection between adjoining portions of the fastener member which will take a part, at least, of the bending strain off of the fastener element in case of excessive or continuous bending thereof.

The principal objects of my invention are to relieve the bending strains on fastener members of the type having the individual fastener elements joined together as in coiled fastener members; to construct the fastener member in a sectional form with provision between or at the juncture of the sections for minimizing bending strain on the fastener sections; to provide points throughout the length of a coiled fastener member, where bending may occur without straining or injuring the wire of which the member is composed; to mount the sections of the fastener member so that they are maintained in the proper adjoining relative positions and operate in the same manner as a continuous fastener member; to provide a shoe or the like, having a quick operating fastener, with a special construction for flexibility at the points where severe bending strains occur; and in general to provide an improved fastener of the type referred to which is simple and inexpensive and more durable than those heretofore used.

On the drawings Fig. 1 is a perspective view of an overshoe with a quick operating fastener thereon embodying my improvements.

Fig. 2 is an enlarged transverse sectional view of the fastener and adjoining portions of the fabric to which it is attached.

Fig. 3 is a sectional view on the line 3—3 of Fig. 2;

Fig. 4 is an enlarged perspective view of one of the sections of the fastener member; and, Fig. 5 is a fragmentary view, partly in section, on the line 5—5 of Fig. 3.

I have shown my invention as applied to an overshoe of the type commonly worn by women, although it is to be understood that the improvement is capable of and intended for use in connection with other types of foot-wear, or other articles wherein a quick operating fastener is employed and particularly where the fastener is subjected to excessive bending strains.

Referring to the drawings the reference numeral 1 indicates an overshoe as a whole which is divided down the front and has coiled fastener members 2 and 3 secured respectively to the forward edges of the overshoe quarters 4 and 5, and 6 indicates a slider which is adapted, upon movement in one direction, to nest the coils of one of the members 2 or 3 between the coils of the other member and thereby interlock said members, and upon movement in the reverse direction said slider releases and disengages said members from one another.

Fastener members of the type shown herein have heretofore been made as continuous coils extending from top to bottom of the opening. They are subjected to constant bending at the front of the ankle joint and more or less strain, depending on the construction and fit of the overshoe, which in some cases has been sufficient to break the wire. In order to avoid excessive bending of the fastener members at the points where the greatest amount of bending occurs, and thus avoid any possibility of breakage, I construct the elements 2 and 3 at these points of short sections 7 and 8, so as to break the continuity of the members 2 and 3, as for example as indicated at 9.

It is necessary that the sections 7 and 8 must be mounted so that the coils thereof are in alignment with the coils of the adjoining sections and so that the adjoining end coils are spaced apart the same distance as the intermediate coils. Fastener elements of quick operating fasteners are usually secured to tapes or to the edges of a fabric structure, and in the case of coil fasteners this is conveniently accomplished by running a cord 10, through the fastener member and passing strands 11, between successive coils of the fastener member and folding same around the cord 10. These strands may be separate and have the ends united subsequent to their folding around the cords 10, or they may be intermediate unwoven strands of a fabric strip as in application, Serial No. 757,320, filed Dec. 22, 1924, or other form of mounting may be used if desired. The sections 7 and 8 are provided at each end with radially extending arms 12, lying in the same plane and having their extremities bent toward one another as clearly shown at 13 in Figs. 3 and 4. The sections 7—7 or 8—8 are arranged end to end in proper spaced relation, and have the cord 10, passed therethrough, and the unwoven strands 11, are inserted between the coils and folded around the cord 10. The fabric portions 14 to which the strands 11, are attached are secured together with the arms 12, and extremities 13, thereof locked in place therebetween by cementing or otherwise securing the side portions 14—14 together and the sections 7—7 and 8—8 are thereby held in a fixed relation so that the adjoining end coils of the sections 7—7 or 8—8 are maintained in the same spaced relation as the successive coils of the sections. The arms 12—12 not only serve to hold the sections in proper spaced relation but they also serve to hold the sections in axial alignment and prevent any twisting movement of the coils about the axis. This is particularly important in connection with crimped wire coils such as those which compose sections 8 as the corresponding crimped portions of the series of coils are by the above described fastening means held in axial alignment.

With this construction are flexibility at the points indicated at 9 in Fig. 1 depend upon the flexibility of the tapes or fabrics supporting the fastener member and while the sections 7 and 8 normally bend in the same manner as though they were the portion of a continuous coil, nevertheless excessive bending is more or less localized at the juncture of the sections 7—7 and 8—8, or at the points indicated at 9, and bending thus occurs at these points which avoids excessive bending strains on the wire of which the coiled members are formed.

While I have shown and described my invention in a preferred form, I am aware that various changes and modifications may be made without departing from the principles of my invention the scope of which is to be determined by the appended claims.

I claim as my invention:

1. In a quick operating fastener of the class described, the combination of an elongated member comprising a longitudinal series of uniformly spaced fastener elements adapted to be interlocked with and released from another series of fastener elements by movement of a slider therealong, said member being composed of a plurality of individual sections, each including a plurality of fastener elements, and said sections being joined together end to end to form an uninterrupted uniformly spaced series of fastener elements.

2. In a fastening device of the class described, the combination of a plurality of sections each including an assembled series of uniformly spaced fastener elements, and means flexibly connecting the sections end to end so that the fastener elements of one section afford a uniform continuation of the series of fastener elements of the adjoining section.

3. In a fastening device of the class described, the combination of two longitudinal series of fastener elements and a slider operable therealong for interlocking and releasing same, said series of elements being composed of a plurality of sections each including a group of fastener elements, and said sections being flexibly connected together end to end, so as to afford a hinge movement between the sections and hold the sections in position so that the elements on one section form an uninterrupted continuation of the series of elements of the adjoining section.

4. In a fastening device of the class described, the combination of an elongated fastener member comprising a plurality of sections hinged together, and wherein each section comprises a plurality of uniformly spaced fastener elements combined in a unitary structure and forming an uninterrupted continuation of the fastener elements of the adjoining sections.

5. In a fastening device of the class described, the combination of a plurality of sections each comprising a series of uniformly spaced fastener elements, and a fabric stringer connecting said sections so that the fastener elements at the ends of adjoining sections are spaced apart the same as the adjoining elements of a section.

6. In a fastening device of the class described, the combination of an elongated fastener member comprising a plurality of sections, each of which includes a series of uniformly spaced fastener elements connected together in a unitary structure, and attaching means at the ends of the sections whereby the latter are joined together.

7. In a fastening device of the class described, the combination of an elongated fastener member composed of sections each of which comprises a series of fastener elements which are adapted to be interlocked with and released from corresponding fastener elements by movement of a slider therealong, said sections being provided with laterally extending arms at the ends for mounting the sections in end to end adjoining positions.

8. In a fastening device of the class described, the combination of an elongated fastener member comprising a plurality of sections, each of which includes a series of uniformly spaced fastener elements with laterally extending arms at the ends, and a tape having the arms connected thereto for holding the sections in endwise adjoining positions.

9. In a fastening device of the class described, the combination of an elongated fastening member composed of sections, each of which includes a series of fastener elements, said sections being provided with laterally extending attaching means at the ends, and a two-ply stringer embracing said means and having the individual fastener elements secured thereto.

10. The method of affording extra flexibility at selected points throughout the length of opposed series of fastener elements which comprises assembling the elements of the two series in corresponding groups, and hinging the adjoining groups of each series together with an attaching strip.

11. The method of forming an elongated fastener member with a longitudinal series of uniformly spaced fastener elements which comprises making up separate sections each comprising a plurality of fastener elements, and then assembling said sections in adjoining end to end relation so that the fastener elements of each section form an uninterrupted continuation of the fastener elements of the adjoining section and then connecting said sections together with an attaching strip.

12. In a fastening device of the class described the combination of opposed series of fastener elements and a slider operable therealong for interlocking and releasing same, the elements of one series comprising wire loop-like portions with spaces between adjoining loop-like portions to receive the elements of the other series therebetween, wire mounting means at the outer side of said series of loop-like portions, a strand inside and extending lengthwise of the series of loop-like portions, and a folded tape embracing said wire mounting means and having said strand connected therewith at the fold so as to hold the series of loop-like portions thereon.

GEORGE W. BLAIR.